L. Z. PRESTON.
TILTING GATE MECHANISM.
APPLICATION FILED MAR. 21, 1911.
1,014,174.
Patented Jan. 9, 1912.
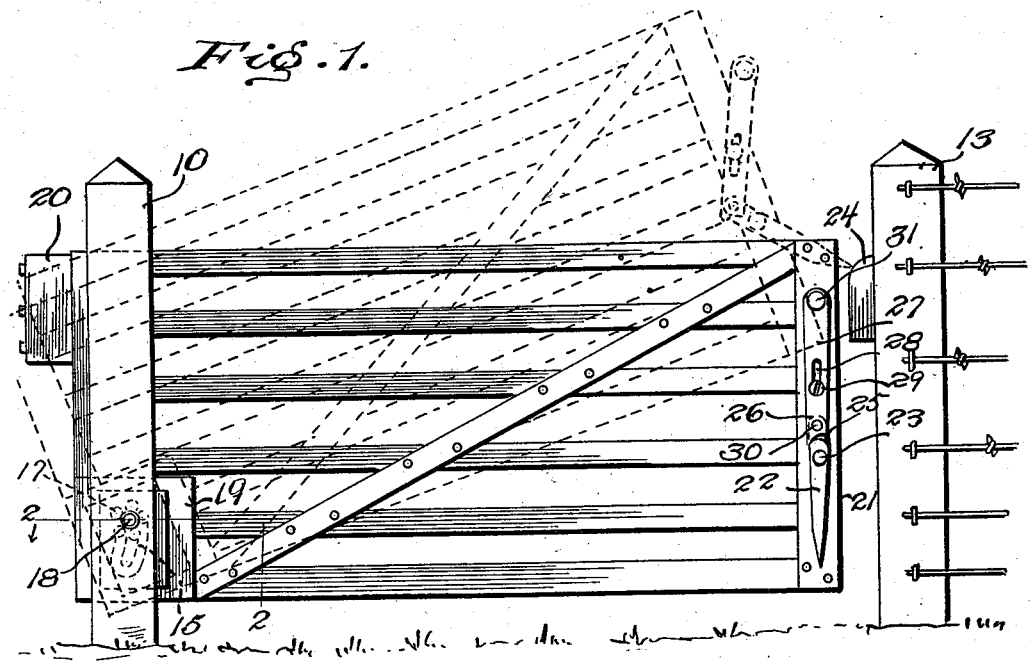
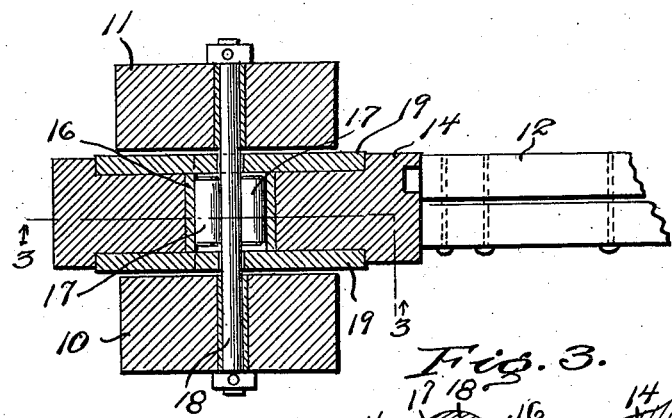
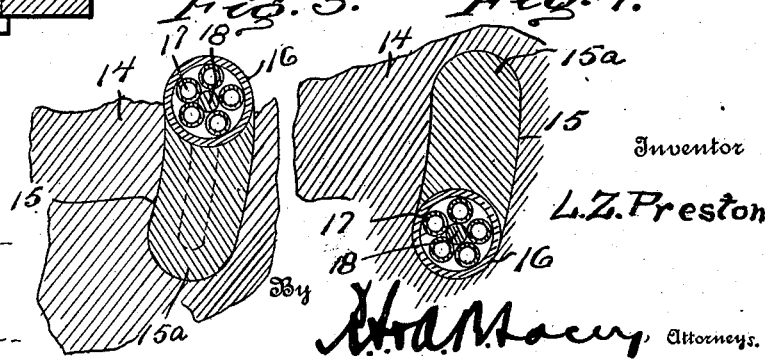
Inventor
L. Z. Preston

UNITED STATES PATENT OFFICE.

LEONARD Z. PRESTON, OF TOPEKA, KANSAS.

TILTING-GATE MECHANISM.

1,014,174.   Specification of Letters Patent.   Patented Jan. 9, 1912.

Application filed March 21, 1911. Serial No. 616,005.

*To all whom it may concern:*

Be it known that I, LEONARD Z. PRESTON, a citizen of the United States, residing at Topeka, in the county of Shawnee and State of Kansas, have invented certain new and useful Improvements in Tilting-Gate Mechanism, of which the following is a specification.

This invention relates to tilting gate mechanism, and has special reference to an improvement in the structure disclosed in co-pending application filed November 17, 1910, Serial No. 592,924, for a farm gate.

This invention has for an object to provide a tilting gate with a pivot bearing wherein the friction between the supporting pivotal pin and the head of the gate is reduced, not only relative to the weight of the gate, but also with relation to the lateral pressure of the gate incident to the swaying of the same under side pressure by the wind or by the operator when releasing and lowering the gate.

The invention has for another object to provide a tilting gate with a pivotal bearing capable of vertical adjustment so as to raise or lower the pivotal center of the gate when required.

For a full understanding of the invention and the merits thereof and also to acquire a knowledge of the details of construction, reference is to be had to the following description and accompanying drawings, in which:

Figure 1 is a side elevation of the improved gate, disclosing the same raised in dotted lines; Fig. 2 is a detail sectional view through the head of the gate on the line 2—2 of Fig. 1; Fig. 3 is a detail sectional view of the bearing members supporting the head and the gate on the line 3—3 of Fig. 2; Fig. 4 is a similar view disclosing a different adjustment of the same.

Corresponding and like parts are referred to in the following description and indicated in all the views of the drawing by the same reference characters.

Referring to the drawing 10 and 11 designate a pair of spaced standards which are suitably mounted upon the ground at one side of the road and carry therebetween the inner or head end of a gate 12. A gate post 13 registers with the outer end of the gate 12. The head of the gate is provided with a block 14 having a substantially vertical arcuate opening 15 for the reception of a sleeve bushing 16 having its ends flush with the sides of the block 14. An arcuate filler block 15$^a$ is fitted in the opening 15 against the bushing 16 to entirely fill the arcuate opening. The inner end of the filler block 15$^a$ is concaved to snugly fit against the adjacent side of the cylindrical bushing 16. The filler block 15$^a$ and the bushing 16 may be reversed in the opening 15 by moving the bushing 16 in to the opposite end of the opening and inverting the filler block 15$^a$ to raise or lower the pivotal center of the gate. Roller bearings 17 are arranged about the inner wall of the bushing 16 and center a pivotal pin 18 passing through the block 14 to support the gate. Engaging against the opposite sides of the block 14 are wear plates 19 having openings therethrough to snugly receive the outwardly projecting ends of a pivotal pin 16. The ends of the pivotal pin 16 are mounted in the standards 10 and 11 in any suitable manner. The plates 19 serve not only as abutments to engage against the inner opposite faces of the standards 10 and 11, but they also serve the purpose of retaining the roller bearings 17 within the bushing 16.

From Fig. 1 it will be observed that the arcuate opening 15 is disposed vertically in the block 14, such opening being provided to admit of the vertical adjustment of the bushing 16 within the block to raise and lower the pivotal center of the gate. The openings through the wear plates 19 are of similar arcuate form so as to allow the free vertical play of the pivot pin 18 when adjusted. The roller bearings 17 are of such size that they can not pass through the openings in the plates 19. The gate 12 is preferably provided with a counterweight 20 so as to counterbalance the gate upon the pivot pin 18. The outer vertical bar 21 of the gate 12 is provided with a stop pin 22 hinged adjacent to its upper end against the side of the bar 21 by a bolt 23 passing through the bar and the pin. The pin 22 is of tapering form, the lower end being pointed and adapted for engagement against the upper edge of a stop 24 carried against the inner side of the post 13. The upper end of the stop pin 22 is reduced to provide a web 25 projecting into the bifurcated lower end 26 of an operating bar 27. The operating bar 27 is provided midway of its ends with a longitudinal slot 28 receiving loosely therethrough a bolt 29 carried through the end bar 21 above the bolt 23. A small pin or rivet 30 passes through the lower end 26 of the operating bar and the web 25 to hingedly connect the bar upon the pin 22. The upper end of the operating bar 27 is provided with an outwardly extending handle 31 adapted to be grasped by the operator to swing the upper end of the bar 27 about the bolt 29, and to raise and lower the gate.

In raising the gate the operator grasps the handle 31 and swings the gate up about the pivot pin 18, the roller bearing 17 taking up the friction between the block 14 and the pivot pin so that but a slight upward pressure is necessary to raise the gate. When the gate reaches the desired height the operator forces the handle 31 out and swings the operating bar 27 about the bolt 29 when a slight inward and downward pressure moves the bar 27 to dispose the bolt 29 in the upper end of the slot 28. This action rotates the stop pin 22 about the bolt 23 and moves the pointed extremity of the pin 22 into the path of the post 13. The downward pressure of the handle 31, at the same time, moves the gate down and brings the extremity of the pin 22 against the upper edge of the stop 24. As disclosed in the drawing the upper edge of the stop 24 is preferably inclined or beveled so as to receive the pin 22 at various angles.

When it is desired to release the gate and to close the same the operator simply grasps the handle 31 and draws the gate up. This movement swings the bar 27 in to dispose the bolt 29 in the lower end of the slot 28, simultaneously raising the point of the pin 22 from the stop 24 and swinging the lower end of the pin 22 in out of the path of the post 13. As the operating bar 27 and the pin 22 are now in vertical registration with one another, a downward pressure upon the handle 31 forces the gate into a closed position and does not move the bar or the pin as the pin 22 is mounted for rotation only upon the bolt 23.

Having thus described the invention, what is claimed is:

1. A tilting gate including a block having a vertical arcuate opening therethrough, a cylindrical bushing fitting in the opening of the block for adjustment in the opposite ends of the opening, a filler block engaging in the opening and binding the bushing in the end thereof, a supporting pin engaging through the bushing, a plurality of roller bearings disposed in the bushing about the supporting pin, and wear plates carried against the sides of the block and having reduced arcuate openings to snugly receive the ends of the pivotal pin, the bushing and the bearings and the filler block engaging at their ends against the inner faces of the wear plates.

2. A tilting gate mechanism including a gate, a block carried by the gate, a cylindrical bushing carried through the block and adapted for vertical adjustment therein, a supporting pin engaging through the bushing, bearings interposed between the pin and the inner wall of the bushing, and wear plates disposed against the opposite sides of the block and adapted to hold the bushing and the bearings in position.

3. A tilting gate including a block, a cylindrical bushing adjustably disposed within the block, a pin engaging through the block for supporting the same, and bearings interposed between the bushing and the pin.

4. A tilting gate mechanism including a gate, a block carried at the head of the gate, a bushing carried in the block for vertical adjustment, a supporting pin engaging through the bushing, and bearings interposed between the bushing and the pin.

5. A device as specified including a block, a vertically adjustable bushing carried through the block, bearings arranged within the bushing, wear plates carried against the sides of the block for holding the bushing and the bearings in position, and a supporting pin engaging through the wear plates and between the bearings.

6. A pivotal structure including a block having a vertical slot therethrough, a movable bushing arranged in the slot, a filler block disposed in the slot for holding the bushing in the ends thereof, and a supporting pin engaging through the bushing.

7. A pivotal structure including a block having a vertical slot therein, a bushing carried for vertical adjustment in the slot, a pin engaging through the bushing for supporting the block, and retaining means carried by the block for holding the bushing in the opposite ends of the slot.

8. A pivotal structure including a block, a bushing disposed for vertical adjustment in the block, retaining means engaging with the bushing for holding the same in adjustment in the slot, and a supporting pin engaging through the bushing.

9. A pivot structure including a block, a bushing disposed for vertical adjustment in the block, retaining means carried by the block and engaging with the bushing for holding the same in vertical position, a pin engaging through the bushing, and bearings interposed between the pin and the inner wall of the bushing.

10. A pivot structure including a block having an arcuate vertical slot therethrough, a filler block engaging in one end of the slot and having an arcuate inner end, a cylindrical bushing fitting in the open end of the slot and against the arcuate end of the filler block, bearings carried within the bushing, a pin engaging through the bushing between the bearings, and wear plates carried against the sides of the block for closing the ends of the arcuate opening.

In testimony whereof I affix my signature in presence of two witnesses.

LEONARD Z. PRESTON. [L. S.]

Witnesses:
CHARLES SCOTT,
C. W. HODGES.

Copies of this patent may be obtained for five cents each, by addressing the "Commissioner of Patents, Washington, D. C."